United States Patent
Rahmati et al.

(10) Patent No.: US 9,716,601 B2
(45) Date of Patent: Jul. 25, 2017

(54) METHOD AND APPARATUS FOR SOFT DETECTION OF HIGH ORDER QAM SYMBOLS IN MIMO CHANNELS

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/987,392

(22) Filed: Jan. 4, 2016

(65) Prior Publication Data
US 2016/0315792 A1 Oct. 27, 2016

Related U.S. Application Data

(60) Provisional application No. 62/152,366, filed on Apr. 24, 2015, provisional application No. 62/250,268, filed on Nov. 3, 2015.

(51) Int. Cl.
| | | |
|---|---|---|
| *H03D 1/00* | (2006.01) | |
| *H04L 27/06* | (2006.01) | |
| *H04L 25/02* | (2006.01) | |
| *H04L 1/00* | (2006.01) | |
| *H04L 27/38* | (2006.01) | |
| *H04B 7/0413* | (2017.01) | |

(52) U.S. Cl.
CPC ....... *H04L 25/0256* (2013.01); *H04B 7/0413* (2013.01); *H04L 1/0054* (2013.01); *H04L 27/38* (2013.01)

(58) Field of Classification Search
None
See application file for complete search history.

(56) References Cited

U.S. PATENT DOCUMENTS

| | | | |
|---|---|---|---|
| 7,418,051 B2 | 8/2008 | Kramer et al. | |
| 7,583,763 B2 | 9/2009 | Nissani | |
| 7,720,169 B2 | 5/2010 | Reuven et al. | |
| 7,751,506 B2 | 7/2010 | Niu et al. | |
| 7,852,802 B2 * | 12/2010 | Prasad | H04B 7/0697 370/328 |
| 8,295,378 B2 | 10/2012 | Su et al. | |

(Continued)

OTHER PUBLICATIONS

Chun et al., A simple slicer for soft detection in Graycoded QAM-modulated MIMO OFDM systems, Source: 2012 35th IEEE Sarnoff Symposium, 5 pp., 2012; ISBN-13: 978-1-4673-1465-7 DOI:10.1109/SARNOF.2012.6222717; Conference: 2012 35th IEEE Sarnoff Symposium, May 21-22, 2012, Newark, NJ, USA; Publisher: IEEE, Piscataway, NJ, USA.

*Primary Examiner* — Shuwang Liu
*Assistant Examiner* — Gina McKie
(74) *Attorney, Agent, or Firm* — The Farrell Law Firm, P.C.

(57) ABSTRACT

Methods and apparatus for soft MIMO detection of high order QAM with initial candidate reduction are described. A method includes receiving a plurality of signals including Q-order QAM symbols; determining a reduced candidate set including C potential candidates, where C is less than Q; calculating Euclidean distances (EDs) based on the reduced candidate set; and generating LLR information based on the calculated EDs.

14 Claims, 7 Drawing Sheets

(56) References Cited

U.S. PATENT DOCUMENTS

| | | |
|---|---|---|
| 8,412,260 B2 | 4/2013 | Rave |
| 8,428,159 B2 | 4/2013 | Atwater et al. |
| 8,532,202 B2 | 9/2013 | van Zelst |
| 8,660,217 B2 | 2/2014 | Choi et al. |
| 8,670,508 B2 | 3/2014 | Patel et al. |
| 8,774,326 B2 | 7/2014 | Au Yeung et al. |
| 8,799,751 B2 | 8/2014 | Shabany et al. |
| 8,811,545 B2 | 8/2014 | Annavajjala et al. |
| 9,008,240 B1 | 4/2015 | Wan et al. |
| 9,042,493 B2 | 5/2015 | Rog et al. |
| 9,071,316 B2 | 6/2015 | Rusek |
| 2007/0019756 A1* | 1/2007 | Hedayat .................. H04B 7/04 375/261 |
| 2007/0230608 A1 | 10/2007 | Li |
| 2008/0279298 A1* | 11/2008 | Ben-Yishai ....... H04L 25/03242 375/261 |
| 2011/0026647 A1* | 2/2011 | Zangi ................ H04L 25/03318 375/341 |
| 2011/0080979 A1* | 4/2011 | Duggan ................ H04L 1/0045 375/340 |
| 2014/0205043 A1 | 7/2014 | Im et al. |

\* cited by examiner

US 9,716,601 B2

METHOD AND APPARATUS FOR SOFT DETECTION OF HIGH ORDER QAM SYMBOLS IN MIMO CHANNELS

PRIORITY

The present application claims priority under 35 U.S.C. §119(e) to U.S. Provisional Application Nos. 62/152,366, and 62/250,268, which were filed in the U.S. Patent and Trademark Office on Apr. 24, 2015 and Nov. 3, 2015, respectively, the content of each of which is incorporated herein by reference.

FIELD OF THE DISCLOSURE

The present disclosure relates generally to soft detection of high order quadrature amplitude modulation (QAM) symbols, and more specifically, to soft detection of high order QAM symbols in multiple input multiple output (MIMO) channels, with or without prior information.

BACKGROUND

Increasing demand for data transmissions in wireless networks has increased the need for higher throughput systems. High order modulation and/or MIMO set-up can address the demand for high throughput. For example, 256-QAM signaling has been adopted by the 3$^{Rd}$ Generation Partnership Project (3GPP) group in Long Term Evolution (LTE)-Release 12 to increase LTE system throughput. Further, the currently developing Institute of Electrical and Electronics Engineers (IEEE) 802.11ax standard is considering 1024-QAM to further increase Wi-Fi throughput.

However, hardware implementation complexity of maximum likelihood (ML) detection of MIMO channels increases exponentially with the number of transmitted layers and modulation order, which makes real-world hardware implementation infeasible. For example, the hardware complexity for soft detection of 256-QAM MIMO with two transmitted layers is roughly 16 times the hardware complexity of 64-QAM MIMO with two transmitted layers. Therefore, the use of sub-optimal schemes is inevitable in practical hardware implementation.

Some sub-optimal detection schemes have already been introduced. The most common scheme which reduces optimal ML complexity is obtained with max-log-MAP (MLM) approximation. However, high order modulation signaling such as 256-QAM still makes hardware implementation of MLM scheme infeasible.

Soft list sphere decoding (LSD) has also been introduced as an alternative to further reduce complexity in soft detection of coded MIMO channels. However, the variable complexity of LSD, as well as the complexity of search space selection of LSD, introduce new challenges in hardware implementation.

SUMMARY

In accordance with an aspect of the present disclosure, a method is provided for log-likelihood ratio (LLR) generation for soft detection of QAM symbols in MIMO coded channels. The method includes receiving a plurality of signals including Q-order QAM symbols; determining a reduced candidate set including C potential candidates, where C is less than Q; calculating Euclidean distances (EDs) based on the reduced candidate set; and generating LLR information based on the calculated EDs.

In accordance with another aspect of the present disclosure, an apparatus is provided for soft detection of QAM symbols in MIMO coded channels. The apparatus includes a plurality of antennas; and a MIMO detector that receives, via the plurality of antennas, a plurality of signals including Q-order QAM symbols, determines a reduced candidate set including C potential candidates, where C is less than Q, calculates EDs based on the reduced candidate set, and generates LLR information based on the calculated EDs.

In accordance with another aspect of the present disclosure, a system on chip is provided, which includes a MIMO detector that receives a plurality of signals including Q-order QAM symbols, determines a reduced candidate set including C potential candidates, where C is less than Q, calculates EDs based on the reduced candidate set, and generates LLR information based on the calculated EDs; and a decoder that decodes the signals using the LLR information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
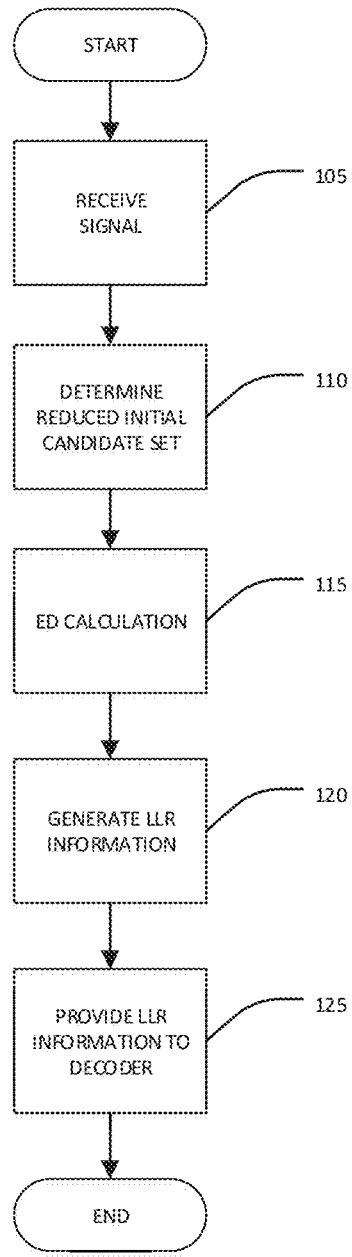
FIG. 1 is a flowchart illustrating a method of generating LLR for soft detection of MIMO coded channels according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in this specification are not necessarily all referring to the same embodiment.

The present disclosure has been made to address at least the problems and/or disadvantages described above and to provide at least the advantages described below.

An aspect of the present disclosure is to provide low complexity schemes for soft detection of high order QAM symbols in MIMO channels, with or without prior information.

Another aspect of the present disclosure is to provide an ICR scheme to reduce the number of ED calculations during LLR generation.

Another aspect of the present disclosure is to provide a scheme for initial candidate set selection relying on linear MMSE detection.

Another aspect of the present disclosure is to provide a scheme for initial candidate set selection by detecting only I and Q signs of a target layer, which simplifies MMSE detection.

Another aspect of the present disclosure is to improve accuracy of an initial candidate set, by using prior information in initial candidate set selection with MMSE soft interference cancellation (MMSE-SIC).

Another aspect of the present disclosure is to improve accuracy of an initial candidate set, by providing an approximation over MMSE-SIC by using self-prior information to avoid computational complexity.

Herein, the terminology "search space" and "initial candidate set" may be used interchangeably.

The present disclosure first describes 256 QAM signaling detection in MIMO channels with two transmitted layers with the understanding that the schemes of the present disclosure can be generalized to other QAM modulation orders and higher rank MIMO channels. To reduce the complexity of the search space (or equivalently candidate set) selection, a fixed complexity search space is provided with 128 initial candidates, such that in the selection of the search space (or the initial candidate set) only an initial estimate of an in-phase (I) sign and a quadrature (Q) sign of the transmitted signal is obtained. The present disclosure then describes the use of a priori information (from decoder output) to improve initial candidate set selection accuracy. MMSE-SIC is described in use of both cross-prior and self-prior information. Thereafter, a low complexity scheme is provided using self-prior information, wherein an initial MMSE estimation of the transmitted signal is obtained without any prior information, then prior information on I and Q signs of the transmitted signal is applied (from decoder output either in re-transmission or in iterative detection and decoding (IDD)) in hard detection of (slicing over) the initial MMSE estimated value. This scheme provides slicer boundaries as a linear function of the self-prior information, which decreases complexity significantly.

Although descriptions of various embodiments of the present disclosure will be provided below, which focus on 256-QAM signaling detection in MIMO channels with two transmitted layers, it will be appreciated by a person having ordinary skill in the art that the present disclosure is also applicable to other QAM modulation orders, e.g., 512-QAM and 1024-QAM, and higher rank MIMO channels.

Additionally, to reduce the complexity of the search space (or candidate set) selection, in accordance with an embodiment of the present disclosure, a reduced size, fixed complexity search space with 128 initial candidates is utilized (instead of 256 initial candidates for 256-QAM signaling detection), such that in the selection of an initial candidate set only an initial estimate of the I and Q sign of the transmitted signal is required. However, it will be appreciated by a person having ordinary skill in the art that the present disclosure is also applicable to other reduced size initial candidate sets, e.g., 64 or 32.

In accordance with another embodiment of the present disclosure, a priori information (e.g., output from a decoder) is used to improve initial candidate set selection accuracy.

ICR Scheme

FIG. 1 is a flowchart illustrating a method of generating LLR for soft detection of MIMO coded channels according to an embodiment of the present application.

Referring to FIG. 1, a receiving apparatus including a plurality of antennas receives a plurality of signal streams from a plurality of transmitted signals at 105.

In a point-to-point MIMO system with 2 transmit antennas and $n_R$ receiver antennas, a channel model for MIMO rank 2 can be written as shown in Equation (1) below.

$$y = Hx + n = h_0 x_0 + h_1 x_1 + n \qquad (1)$$

In Equation (1), $y=[y_0, \ldots, y_{r-1}]^T$ is an $n_R \times 1$ receive signal vector, $x=[x_0, x_1]^T$ is a $2 \times 1$ transmit signal vector, $H=[h_0, h_1]$ is an $n_R \times 2$ channel coefficient matrix, $h_i = [h_{i,0}, \ldots, h_{i,n_R-1}]^T$, $h_{i,j}$ represents a channel between i-th transmit and j-th receive antennas, and n is an additive white Gaussian noise vector with covariance $E\{nn^H\}=\sigma^2 I$. In addition, each symbol $x_i$ carries a bit vector $b_i=(b_{i,0} \ldots b_{i,M-1}) \in \{0,1\}^M$. Therefore, an i-th layer's transmit symbol $x_i$ is chosen from 256-QAM constellation with 256 constellation points and is normalized such that $E\{|x_i|^2\}=1$.

For the channel model shown in Equation (1), a soft maximum likelihood (ML) receiver to generate a posteriori log-likelihood ratio (LLR) for l-th bit $b_{0,l}$ is shown in Equation (2).

$$L_A(b_{0,l}) = \log\frac{P(b_{0,l}=0 \mid y)}{P(b_{0,l}=1 \mid y)} = \log\frac{P(y \mid b_{0,l}=0)P(b_{0,l}=0)}{P(y \mid b_{0,l}=1)P(b_{0,l}=1)} \qquad (2)$$

$$= \log\frac{\sum_{x_0:b_{0,l}=0}\sum_{x_1} P(y \mid x_0, x_1)\prod_{(m,n)\neq(i,l)} P(b_{m,n})}{\sum_{x_0:b_{0,l}=1}\sum_{x_1} P(y \mid x_0, x_1)\prod_{(m,n)\neq(i,l)} P(b_{m,n})} + L_a(b_{0,l})$$

$$= \log\frac{\sum_{x_0:b_{0,l}=0}\sum_{x_1} e^{-\frac{\|y-Hx\|^2}{\sigma^2}}\prod_{(m,n)\neq(i,l)} P(b_{m,n})}{\sum_{x_0:Ab_{0,l}=1}\sum_{x_1} e^{-\frac{\|y-Hx\|^2}{\sigma^2}}\prod_{(m,n)\neq(i,l)} P(b_{m,n})} + L_a(b_{0,l})$$

In Equation (2), $$p(y \mid x) \sim \exp\left(-\frac{1}{\sigma^2}\|y-Hx\|^2\right)$$

and $$L_a(b_{0,l}) = \frac{P(b_{0,l}=0)}{P(b_{0,l}=1)}$$

is a priori LLR for $b_{0,l}$. However, the direct implementation of the LLR calculation above involves searching over $256 \times 256$ EDs, imposing a serious burden for hardware implementation. To reduce the number of EDs involved in LLR calculations and avoid exponential operations, LLR generation for $x_0=I+jQ$ is considered, where an MLM approximation method for soft non-linear joint MIMO detection replaces the summation operations in Equation (2) with max operations, as shown in Equation (3).

$$L_A(b_{0,l}) = \log\frac{\max\limits_{x_0:b_{0,l}=0}\max\limits_{x_1}e^{-\frac{\|y-Hx\|^2}{\sigma^2}}\prod\limits_{(m,n)\neq(i,l)}P(b_{m,n})}{\max\limits_{x_0:b_{0,l}=1}\max\limits_{x_1}e^{-\frac{\|y-Hx\|^2}{\sigma^2}}\prod\limits_{(m,n)\neq(i,l)}P(b_{m,n})} + L_a(b_{0,l}) \quad (3)$$

$$= \frac{1}{\sigma^2}\left(\begin{array}{l}\min\limits_{b_{0,l}=1}\left(\|y-Hx\|^2 - \frac{1}{2}\sum\limits_{(m,n)\neq(i,l)}(-1)^{b_{m,n}}L_a(b_{m,n})\right) - \\ \min\limits_{b_{0,l}=0}\left(\|y-Hx\|^2 - \frac{1}{2}\sum\limits_{(m,n)\neq(i,l)}(-1)^{b_{m,n}}L_a(b_{m,n})\right)\end{array}\right) +$$

$$L_a(b_{0,l})$$

As shown above for Equation (3), even for the MLM scheme, 256 EDs in LLR generation of $b_{0,l}$ are required to be calculated.

Referring again to FIG. 1, at 110, the receiving apparatus, e.g., a MIMO detector therein, determines a reduced initial candidate set. In accordance with an embodiment of the present disclosure, an ICR scheme is provided with an initial candidate set of 128, in order to reduce the number of ED calculations.

Similar to sphere decoding (SD), the search space (or candidate set) of MIMO detection may be limited to lattice points around the Babai point. In accordance with an embodiment of the present disclosure, the size of the search space is reduced in order to reduce the computational complexity with the selection of search space around an initial estimation of $x_0$. For example, the MIMO detection search space is limited to 128 points around an initial estimate of $x_0$.

In accordance with an embodiment of the present disclosure, a linear MMSE estimation of $x_0$ may be used for selection of a search space (or an initial candidate set). The MMSE estimation $\hat{x}_0$ may be obtained using Equation (4).

$$\hat{x}_0 = \frac{1}{ch_{pow}}((|h_1|^2 + \sigma^2)h_0^H y - h_0^H h_1 h_1^H y) \quad (4)$$

$$= \frac{((|h_1|^2+\sigma^2)|h_0|^2 - |h_0^H h_1|^2)x_0 + \sigma^2|h_0^H h_1|^2 x_1 + n'}{ch_{pow}}$$

In Equation (4), $ch_{pow}=(|h_1|^2+\sigma^2)(|h_0|^2+\sigma^2)-|h_0^H h_1|^2$ and $n'=(|h_1|^2+\sigma^2)h_0^H n - h_0^H h_1 h_1^H n$.

Figure 2:
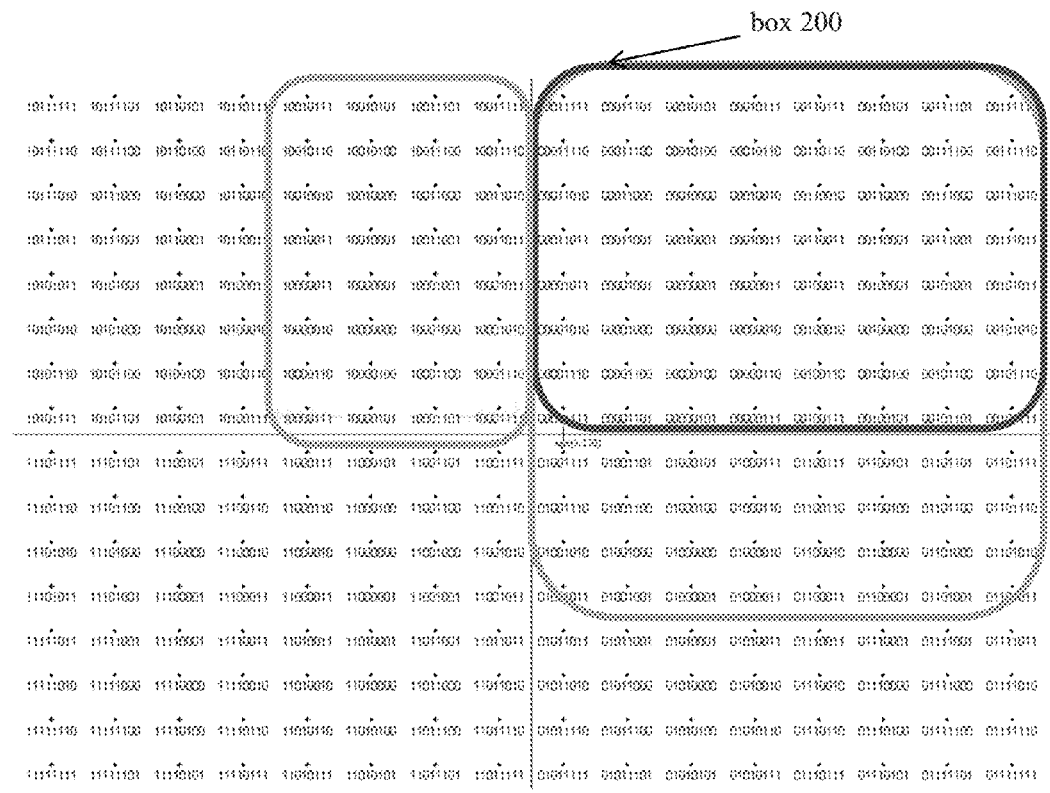
FIG. 2 illustrates a reduced initial candidate set according to an embodiment of the present disclosure.

For soft decoding, in order to include all possibilities of the bits in the selected candidate set, i.e., for each $i\in\{0,\ldots,7\}$, at least one symbol with $b_{0,i}=0$ and one with $b_{0,i}=1$ is used. There may be many possibilities for the initial candidate set to satisfy this condition for a given number of candidates. However, for 128 initial candidates, in accordance with an embodiment of the present disclosure, an initial candidate set is determined as illustrated in FIG. 2, for $I=\text{Re}\{\hat{x}_0\}>0$ and $Q=\text{Im}\{\hat{x}_0\}>0$. The initial candidate set illustrated in FIG. 2 ensures that there is at least one candidate for each bit value at each bit position.

Referring to FIG. 2, an initial candidate set is illustrated, where the initial estimation is located inside box 200. For other quadrants, a symmetric point may be selected.

In accordance with an embodiment of the present disclosure, the initial candidate set selection only requires detection of the I and Q signs of $x_0$, which significantly simplifies linear MMSE detection. Instead of calculating $\hat{x}_0$, any scaled version of I and Q may be used in candidate set selection. Therefore, instead of $\hat{x}_0$, $ch_{pow}\hat{x}_0$ may be used for the initial candidate set selection and only the I and Q signs of $(|h_1|^2+\sigma^2)h_0^H y-h_0^H h_1 h_1^H y$ are determined. As a result, the initial estimation complexity is significantly reduced in comparison with original MMSE estimation, as there is no need for $ch_{pow}$ calculation and division by $ch_{pow}$ as shown in Equation (4) above.

Referring again to FIG. 1, after the reduced initial candidate set is determined, EDs are calculated at 115 and an LLR for $x_0$ is generated at 120.

Accordingly, if $X_{128}(\hat{x}_0)$ is defined as the set of 128 initial candidates selected by the initial MMSE estimation $\hat{x}_0$ (e.g., the constellation points inside the shaded regions in FIG. 2 represent $X_{128}(\hat{x}_0)$ for $I>0$ and $Q>0$), then a posteriori LLR of $b_{0,l}$, i.e., $L_A(b_{0,l})$, may be generated using Equation (5) below.

$$L_A(b_{0,l}) \approx \quad (5)$$

$$\log\frac{\max\limits_{x_0\in X_{128}(\hat{x}_0)\&b_{0,l}=0}\max\limits_{x_1}e^{-\frac{\|y-Hx\|^2}{\sigma^2}}\prod\limits_{(m,n)\neq(i,l)}P(b_{m,n})}{\max\limits_{x_0\in X_{128}(\hat{x}_0)\&b_{0,l}=1}\max\limits_{x_1}e^{-\frac{\|y-Hx\|^2}{\sigma^2}}\prod\limits_{(m,n)\neq(i,l)}P(b_{m,n})} + L_a(b_{0,l})$$

By applying Max-Log approximation and further by limiting the search space to a subset of constellation points, a non-linear estimation of the actual LLR is obtained. Therefore, LLR clipping may be applied to limit the amount of error in LLR generation using the ICR scheme in comparison with a conventional LLR calculation as shown above in Equation (2).

At 125, the generated LLR for $x_0$ is provided to a decoder of the receiving apparatus.

Performance of the ICR scheme, as described above, under realistic LTE channel conditions may be tested using simulation parameters as shown in Table 1 below.

TABLE 1

| Simulation Parameters | |
| --- | --- |
| System bandwidth | 10 MHz |
| FFT Size | 1024 |
| Number of transmit antennas | 2 |
| Number of receive antennas | 2 |
| Antenna correlation | Low, medium, and high |

Figure 3:
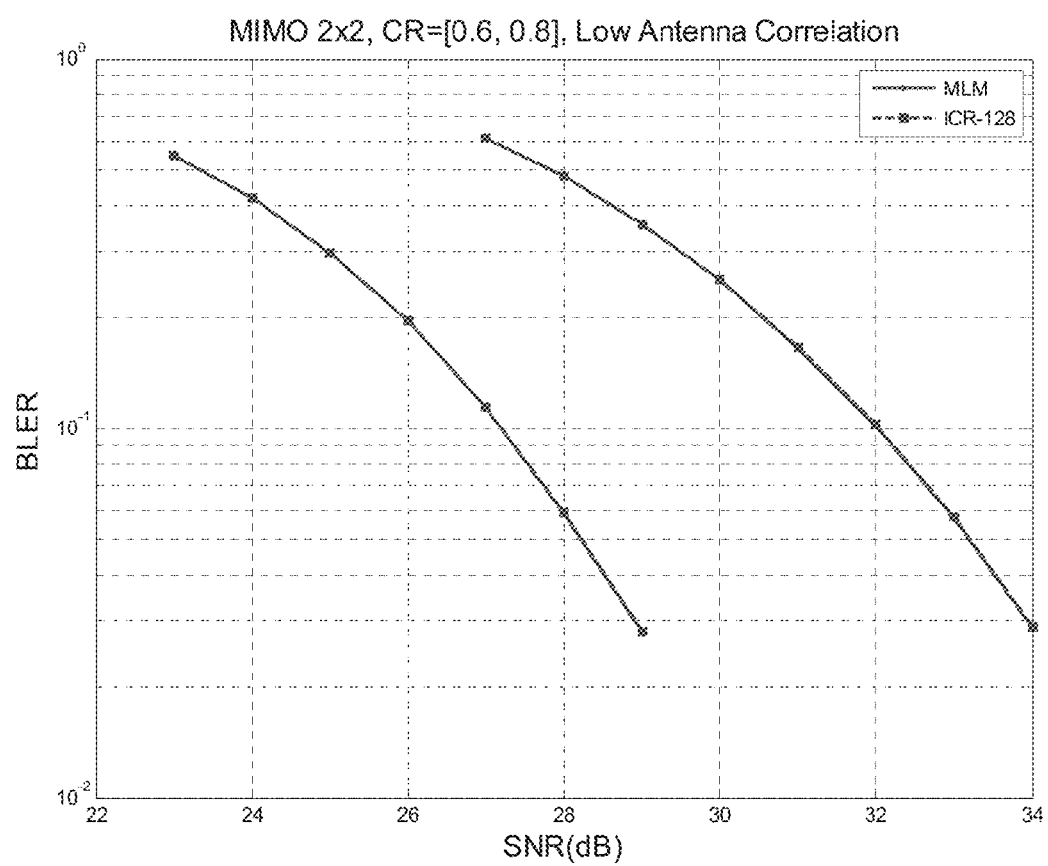
FIGS. 3 and 4 are graphs illustrating block error rate (BLER) performances of an initial candidate reduction (ICR) scheme and MLM for low and high antenna correlation cases, respectively, and different code rates (CRs), according to an embodiment of the present disclosure.
Figure 4:
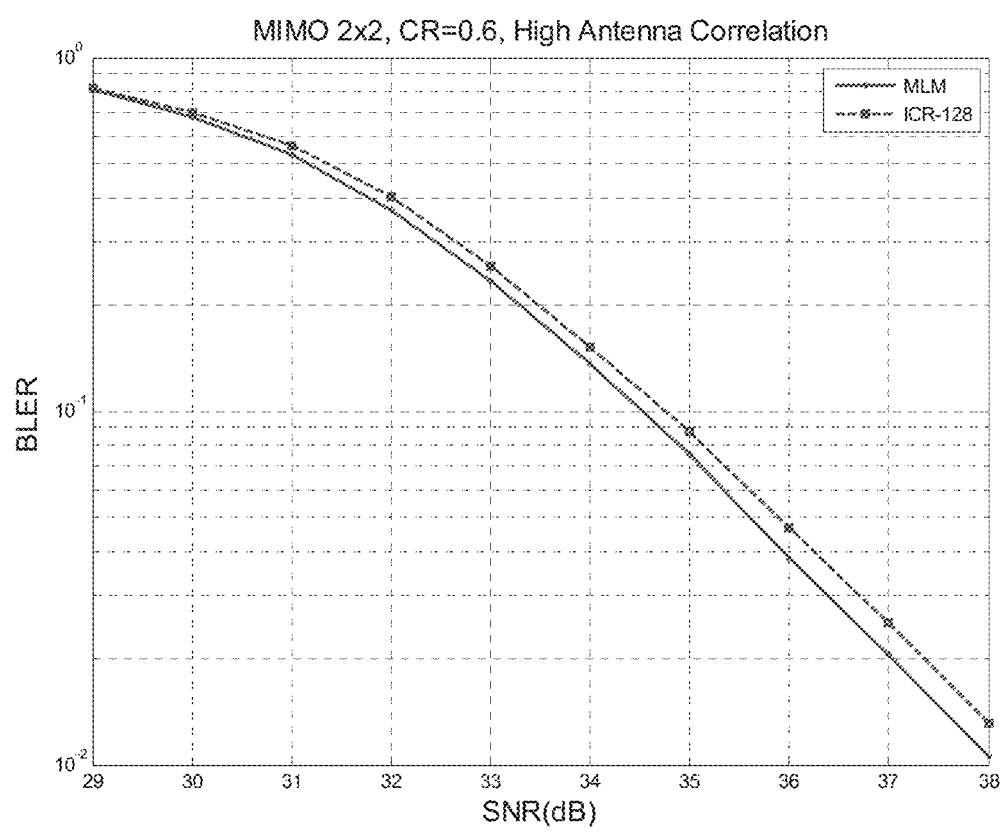

FIGS. 3 and 4 are graphs illustrating BLER performances of the ICR scheme and MLM for low and high antenna correlation cases and different CRs according to an embodiment of the present disclosure. Specifically, FIG. 3 illustrates a comparison between BLER performances of an ICR scheme according to an embodiment of the present disclosure and a fully calculated MLM detection for CRs of 0.6 and 0.8, with low antenna correlation, and FIG. 4 illustrates a comparison between BLER performances of an ICR scheme according to an embodiment of the present disclosure and a fully calculated MLM detection for a CR of 0.6, with high antenna correlation.

As illustrated in FIGS. 3 and 4, the BLER performance of a fully calculated MLM detection, e.g., as shown in Equation (3) above, may be compared with the BLER performance of the ICR scheme, e.g., as shown in Equation (5) above. Notably, for the low antenna correlation, e.g., antenna correlation as defined in the 3GPP standard, any gap between MLM and the ICR scheme is negligible. That is, as illustrated in FIG. 3, the MLM plots for both rates substantially overlap the ICR scheme plots.

However, as illustrated in the high antenna correlation case of FIG. 4, there is more than 0.2 dB gap. Higher antenna correlation results in higher interference level in initial MMSE detection, where for signal to interference-plus-noise ratio (SINR) of $\hat{x}_0$ in Equation (4):

$$SINR(\hat{x}_0) = \frac{|h_0|^2}{\sigma^2} - \frac{|h_0^H h_1|^2}{\sigma^2(|h_1|^2 + \sigma^2)} \quad (6)$$

As can been observed in Equation (6), for fixed $\sigma^2$, $|h_0|^2$ and $|h_1|^2$, SINR is a decreasing function of $|h_0^H h_1|^2$. As a result, MMSE detection quality is a decreasing function of antenna correlation $|h_0^H h_1|^2$.

Based on this observation, in accordance with an embodiment of the present disclosure, prior information may be used in an initial MMSE estimation using the ICR scheme to improve the quality of the estimation and the overall soft detection performance.

MMSE-SIC with Prior Information

Herein, $x_0$ may be referred to as a self layer, i.e., the desired layer in soft detection, and $x_1$ may be referred to as a cross layer. In one embodiment of the present disclosure, an MMSE-SIC method utilizes prior information on the self layer (hereinafter, referred to as "self-prior information") and prior information on the cross layer (hereinafter, referred to as "cross-prior information") in MMSE detection of $x_0$. In another embodiment, self prior information is used to avoid the computation complexity of the MMSE-SIC method.

In accordance with an embodiment of the present disclosure, self-prior information on $x_0$ and/or cross-prior information on $x_1$ may be used in an MMSE-SIC scheme to improve the initial candidate selection quality, as shown in Equation (7).

$$\hat{x}_0 = \frac{1}{ch_{pow}}((\lambda_1^2|h_1|^2 + \sigma^2)\lambda_0^2 h_0^H y - \lambda_0^2 \lambda_1^2 h_0^H h_1 h_1^H y - \sigma^2 \lambda_0^2 h_0^H h_1 \mu_1 - \quad (7)$$
$$((\lambda_1^2|h_1|^2 + \sigma^2)\lambda_0^2|h_0|^2 - \lambda_0^2 \lambda_1^2|h_0^H h_1|^2)\mu_0) + \mu_0 =$$
$$\frac{1}{ch_{pow}}((\lambda_1^2|h_1|^2 + \sigma^2)\lambda_0^2 h_0^H y - \lambda_0^2 \lambda_1^2 h_0^H h_1 h_1^H y -$$
$$\sigma^2 \lambda_0^2 h_0^H h_1 \mu_1 + \sigma^2(\lambda_1^2|h_1|^2 + \sigma^2)\mu_0)$$

In Equation (7), $ch_{pow} = (|h_1|^2 + \sigma^2)(|h_0|^2 + \sigma^2) - |h_0^H h_1|^2$, $\mu_i = E\{x_i\}$, and $$E\left\{\begin{bmatrix} x_0 - \mu_0 \\ x_1 - \mu_1 \end{bmatrix} [x_0^* - \mu_0^* \quad x_1^* - \mu_1^*]\right\} = \begin{bmatrix} \lambda_0^2 & 0 \\ 0 & \lambda_1^2 \end{bmatrix}.$$

In accordance with an embodiment of the present disclosure, a priori LLR from decoder output, e.g., in IDD, and/or from a previously received signal, e.g., from a hybrid automatic repeat request (HARQ) buffer in re-transmission, may be used to calculate $\mu_i$ and $\lambda_i^2$. However, an exact calculation of $\mu_i$ and $\lambda_i^2$ involves exponential terms, which adds computational complexity.

Therefore, in accordance with an embodiment of the present disclosure, an approximation over MMSE-SIC is provided, which uses self prior information to reduce computational complexity often associated with $\mu_i$ and $\lambda_i^2$ calculation.

Approximation Over MMSE-SIC with Prior Information

Without loss of generality, it is assumed in the description below that there is no cross-prior information available, i.e., $\mu_1 = 0$ and $\lambda_1^2 = 1$. Therefore, with use of self-prior information in the initial MMSE detection, $s_0(\mu_0, \lambda_0)$ may be obtained and then used for quadrature phase shift keying (QPSK) slicing (I and Q sign detection) without any prior information, as shown in Equation (8).

$$s_0(\mu_0, \lambda_0) = (|h_1|^2 + \sigma^2)\lambda_0^2 h_0^H y - \lambda_0^2 h_0^H h_1 h_1^H y + \sigma^2(|h_1|^2 + \sigma^2)\mu_0 \quad (8)$$
$$= \lambda_0^2 s_0(0, 1) + \sigma^2(|h_1|^2 + \sigma^2)\mu_0$$

Without loss of generality, the sign detection of I is equivalent to the detection of $b_{0,0}$ from $s_0(\mu_0, \lambda_0)$. Therefore, with QPSK slicing without prior information over $s_0(\mu_0, \lambda_0)$, $b_{0,0}$ may be determined as shown in Equation (9).

$$b_{0,0} = \begin{cases} 0 & RE\{s_0(\mu_0, \lambda_0)\} > 0 \\ 1 & RE\{s_0(\mu_0, \lambda_0)\} \leq 0 \end{cases} \quad (9)$$

The above operation is equivalent with slicing over $s_0(0, 1) = (|h_1|^2 + \sigma^2)h_0^H y - h_0^H h_1 h_1^H y$ by changing slicing boundaries as shown in Equation (10).

$$b_{0,0} = \begin{cases} 0 & RE\{s_0(0, 1)\} > -\frac{\sigma^2(|h_1|^2 + \sigma^2)RE\{\mu_0\}}{\lambda_0^2} \\ 1 & RE\{s_0(0, 1)\} \leq -\frac{\sigma^2(|h_1|^2 + \sigma^2)RE\{\mu_0\}}{\lambda_0^2} \end{cases} \quad (10)$$

On one hand, in calculating $Re\{\mu_0\}$, only even positioned bits, i.e., $b_{0,i}$ for $i \in \{0,2,4,6\}$, are effective. On the other hand, the prior information on $b_{0,0}$ determines the sign of $Re\{\mu_0\}$. It is expected that the most significant effect in detection with prior of $b_{0,0}$ comes from prior information on $b_{0,0}$ and the effect of prior information from other bits to be averaged out. Therefore, to reduce the complexity of the slicing, only the prior information on $b_{0,0}$ is considered in calculation of $\mu_0$ and $\lambda_0^2$ and the other available prior information is ignored, i.e., assuming $$P(b_{0,i} = 0) = P(b_{0,i} = 1) = \frac{1}{2}$$

for $i \neq 0$.

Hence, with only use of prior information on $b_{0,0}$, for 256-QAM, $$RE\{\mu_0\} = \frac{8}{\sqrt{170}} P(b_0 = 0) - \frac{8}{\sqrt{170}} P(b_0 = 1) = \frac{8}{\sqrt{170}} (2P(b_0 = 0) - 1)$$

and  $\lambda_0^2 = E\{|x_0-\mu_0|^2\} = E\{RE\{x_0-\mu_0\}^2 + Im\{x_0-\mu_0\}^2\} = 1 - RE\{\mu_0\}^2$, where $E\{|x_0|^2\} = 1$.

Defining $$TH_0 = \frac{\sigma^2(|h_1|^2 + \sigma^2)RE\{\mu_0\}}{\lambda_0^2}$$

and $L = L_a(b_{0,0})$ and using $$P(b_0 = 0) = \frac{e^{L_a(b_0)}}{1 + e^{L_a(b_0)}},$$

$TH_0$ may be determined as shown in Equation (11).

$$TH_0 = \frac{8\sigma^2(|h_1|^2 + \sigma^2)}{\sqrt{170}} * \frac{2P(b_0 = 0) - 1}{1 - \frac{64}{170} * (2P(b_0 = 0) - 1)^2} \quad (11)$$

$$= \frac{8\sigma^2(|h_1|^2 + \sigma^2)}{\sqrt{170}} * \frac{\frac{e^L - 1}{e^L + 1}}{1 - \frac{64}{170} \frac{(e^L - 1)^2}{(e^L + 1)^2}}$$

$$= 8\sqrt{170}\,\sigma^2(|h_1|^2 + \sigma^2)\frac{(e^L - 1)(e^L + 1)}{170(e^L + 1)^2 - 64(e^L - 1)^2}$$

$$= 8\sqrt{170}\,\sigma^2(|h_1|^2 + \sigma^2)\frac{e^{2L} - 1}{106e^{2L} + 468e^L + 106}$$

Using Taylor expansion of $$\frac{e^{2L} - 1}{106e^{2L} + 468e^L + 106}$$

at L=0 as $$\frac{e^{2L} - 1}{106e^{2L} + 468e^L + 106} = \frac{L}{340} + \frac{11L^3}{346800} - \frac{1099L^5}{58956000} + O(L^7) \approx \frac{L}{340}, TH_0$$

may be approximated as shown in Equation (12).

$$TH_0 \approx 8\sqrt{170}\,\sigma^2(|h_1|^2 + \sigma^2) * \frac{L}{340} = \frac{4\sigma^2(|h_1|^2 + \sigma^2)}{\sqrt{170}} L \quad (12)$$

Therefore, based on the foregoing, a decision rule may be obtained as shown in Equation (13).

$$b_0 = \begin{cases} 0 & RE\{s_0(0,1)\} > -\frac{4\sigma^2(|h_1|^2 + \sigma^2)}{\sqrt{170}} L_a(b_{0,0}) \\ 1 & RE\{s_0(0,1)\} \leq -\frac{4\sigma^2(|h_1|^2 + \sigma^2)}{\sqrt{170}} L_a(b_{0,0}) \end{cases} \quad (13)$$

Accordingly, the threshold in sign detection of I is a linear function of the prior information, which reduces hardware implementation complexity.

Figure 5:
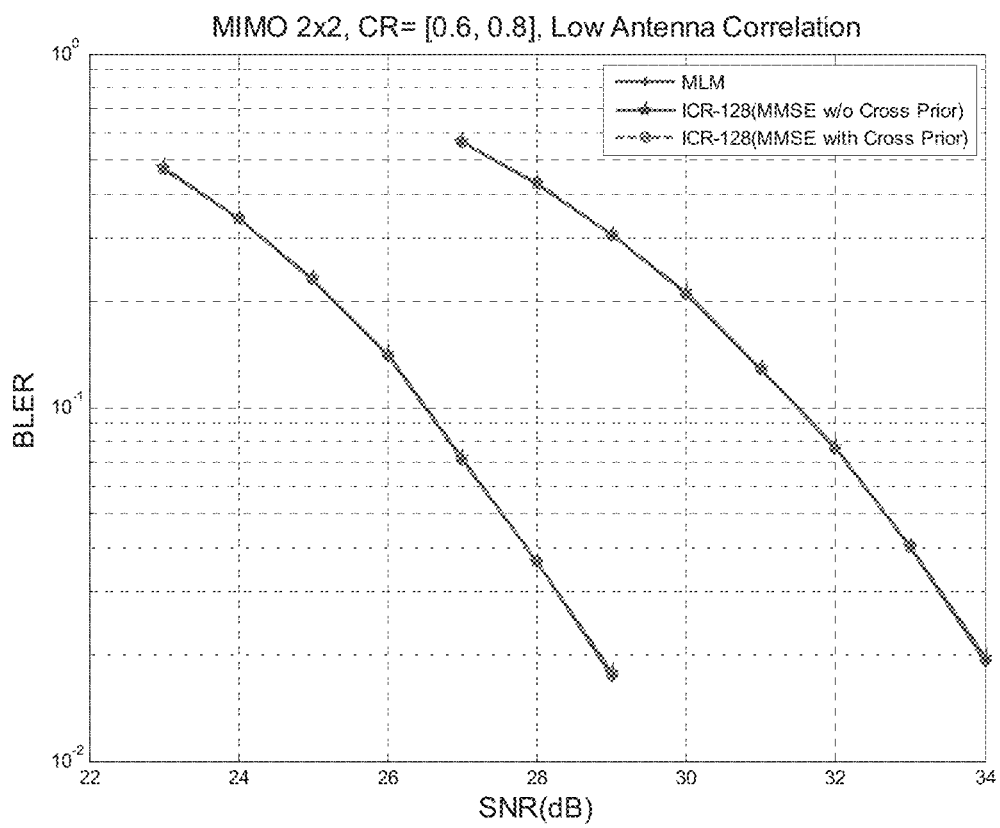
FIGS. 5 and 6 are graphs illustrating BLER performances of an ICR scheme using minimum mean square error (MMSE) with and without cross-prior information and MLM for low and high antenna correlation cases, respectively, and different CRs, according to an embodiment of the present disclosure.
Figure 6:
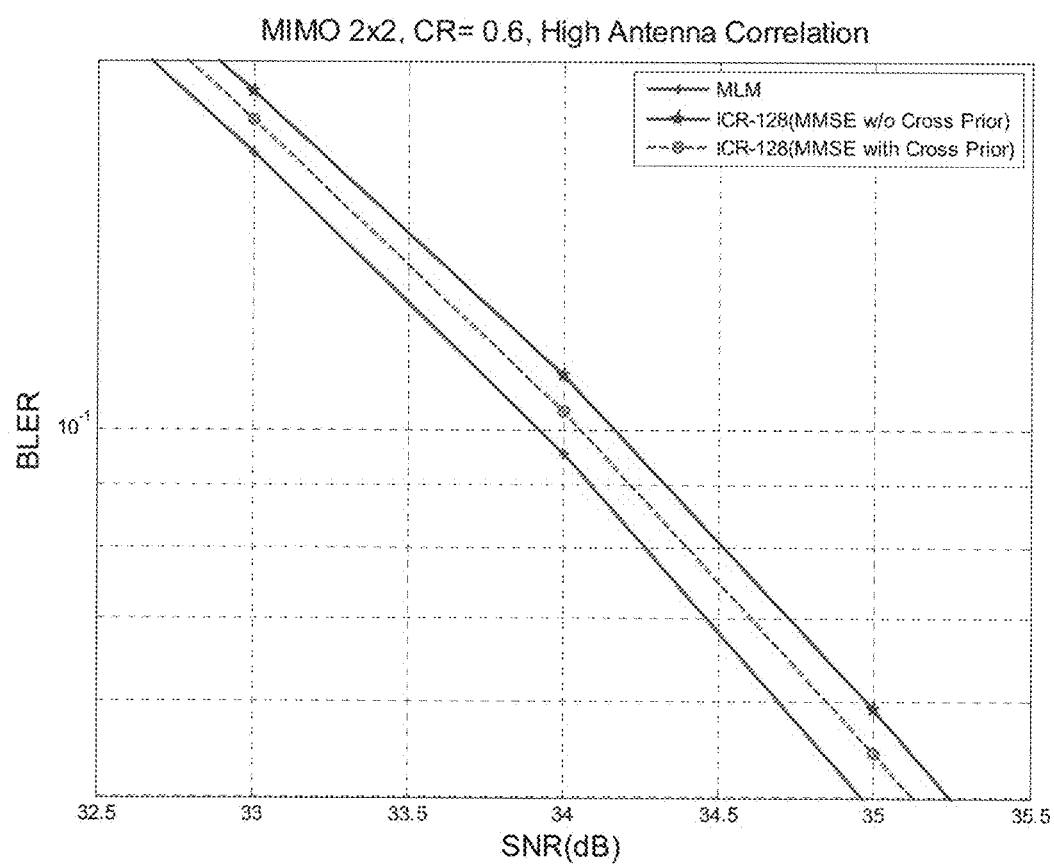

FIGS. 5 and 6 are graphs illustrating BLER performances of an ICR scheme using MMSE with and without cross-prior information and MLM for low and high antenna correlation cases, respectively, and CRs, according to an embodiment of the present disclosure. Specifically, FIG. 5 illustrates a comparison among BLER performances of an ICR scheme using MMSE with cross-prior information, an ICR scheme using MMSE without cross-prior information, and a fully calculated MLM detection for CRs of 0.6 and 0.8, respectively, with low antenna correlation, and FIG. 6 illustrates a comparison among BLER performances of an ICR scheme using MMSE with cross-prior information, an ICR scheme using MMSE without cross-prior information, and a fully calculated MLM detection for a CR of 0.6, with high antenna correlation.

As illustrated in FIG. 5, for low antenna correlation, the performance differences between the ICR scheme using MMSE with cross-prior information, the ICR scheme using MMSE without cross-prior information, and the fully calculated MLM detection are negligible. That is, the differences between the performance differences between the ICR scheme using MMSE with cross-prior information, the ICR scheme using MMSE without cross-prior information, and the fully calculated MLM detection are so small that the plots thereof appear as single line.

Further, as illustrated in FIG. 6, performance gain in using cross prior information increases as antenna correlation increases, where the use of cross prior information reduces the interference from the cross layer in the initial MMSE detection. Further, for high antenna correlation, the ICR scheme using MMSE with cross-prior information improves the performance by about 0.1 dB as compared to the ICR scheme using MMSE without cross-prior information. Additionally, for high antenna correlation, the ICR scheme using MMSE without cross-prior information has better performance than MLM by about 0.1 dB gain.

Figure 7:
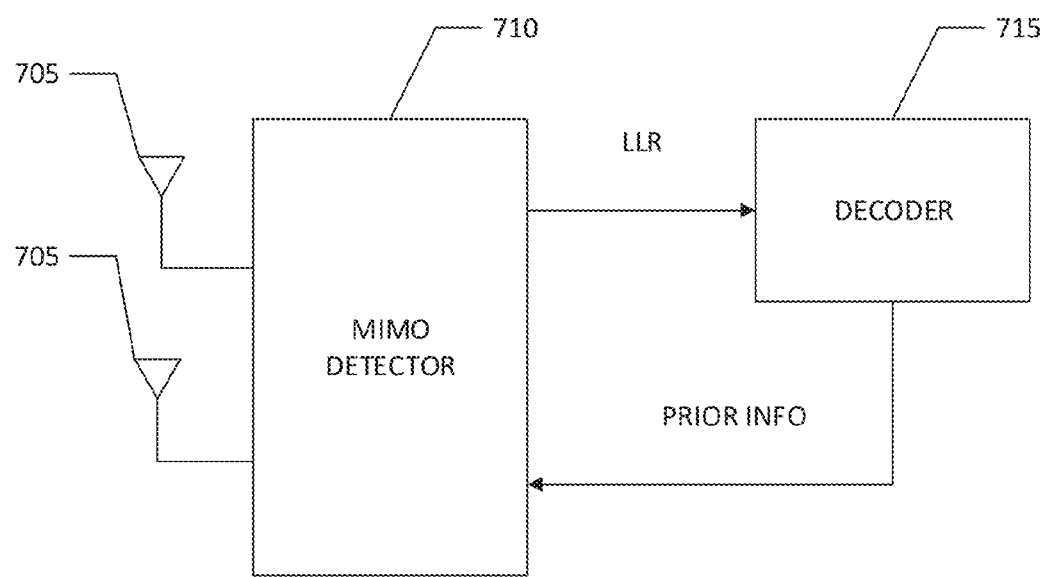
FIG. 7 is a block diagram illustrating a receiving apparatus according to an embodiment of the present disclosure.

FIG. 7 is a block diagram illustrating a receiving apparatus according to an embodiment of the present application.

Referring to FIG. 7, the receiving apparatus, e.g., a user equipment (UE), includes a plurality of antennas 705, a MIMO detector 710, and a decoder 715. While the receiving apparatus may include additional components, e.g., a demodulator, an interleaver, a deinterleaver, etc., as these additional components are not directly related to the present disclosure, their illustration and description has been omitted herein. Further, while the MIMO detector 710 and the decoder 715 are illustrated as separate components in FIG. 7, these components could also be combined in to a single processing unit, such as a modem chipset.

The receiving apparatus illustrated in FIG. 7 may perform the method as illustrated in FIG. 1, including the multiple variations of the ICR scheme, the MMSE-SIC scheme using the prior information, and the approximation over MMSE-SIC scheme using the prior information, as described above.

Specifically, the MIMO detector 710 receives a plurality of signal streams received though the antennas 705, determines a reduced initial candidate set, calculates EDs, generates an LLR for $x_0$, and provides the generated LLR for $x_0$ to the decoder 715.

Further, when the MIMO detector 710 determines the reduced initial candidate set using prior information, e.g., using the MMSE-SIC scheme using the prior information and the approximation over MMSE-SIC scheme using the prior information, the decoder 715 may feedback prior information to the MIMO detector 710.

As described above, certain embodiments of the present disclosure provide low complexity schemes for soft detection of high order QAM symbols in MIMO channels, with or without prior information (from a decoder).

Further, ICR schemes are provided, which reduce the number of ED calculations by half in comparison with soft ML detection, and as a result, may reduce the total hardware size by almost 50%.

Additionally, for initial candidate set selection, only the I and Q signs of the target layer need to be detected, which simplifies MMSE detection.

Further, to improve the accuracy of the initial candidate set, prior information is used in initial candidate set selection with MMSE-SIC. To avoid computational complexity of MMSE-SIC, a low complexity initial detection with prior information is also provided.

Depending on the embodiment of the present disclosure, steps and/or operations in accordance with the present disclosure may occur in a different order, or in parallel, or concurrently for different epochs, etc., in different embodiments, as would be understood by one of ordinary skill in the art.

Depending on the embodiment, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person or remain in close proximity to the person.

Depending on the embodiment, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware (or embedded software), hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits (ASICs), standard integrated circuits, controllers executing appropriate instructions (including microcontrollers and/or embedded controllers), field-programmable gate arrays (FPGAs), complex programmable logic devices (CPLDs), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that includes the actual performance of an operation (such as hardware circuits), that includes programs and/or higher-level instructions to be provided to one or more processors for performance/implementation (such as instructions stored in a non-transitory memory), and/or that includes machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the present disclosure have been shown and described herein, it will be understood by those of ordinary skill in the art that various changes in form and details may be made therein without departing from the spirit and scope of the present disclosure, i.e., the invention is not limited to any embodiments described herein, but is defined by the appended claims and their equivalents.

What is claimed is:
1. A method comprising:
receiving a plurality of signals including Q-order quadrature amplitude modulation (QAM) symbols;
determining a reduced candidate set including C potential candidates, where C is less than Q;
calculating Euclidean distances (EDs) based on the reduced candidate set; and
generating log-likelihood ratio (LLR) information based on the calculated EDs,
wherein determining the reduced candidate set comprises:
determining a linear minimum mean square error (MMSE); and
selecting the reduced candidate set based on the determined linear MMSE, and wherein the linear MMSE is determined using:

$$\hat{x}_0 = \frac{1}{ch_{pow}} \left( (|h_1|^2 + \sigma^2) h_0^H y - h_0^H h_1 h_1^H y \right)$$

$$= \frac{\left( (|h_1|^2 + \sigma^2)|h_0|^2 - |h_0^H h_1|^2 \right) x_0 + \sigma^2 |h_0^H h_1|^2 x_1 + n'}{ch_{pow}}$$

where $\hat{x}_0$ represents an initial MMSE estimation, $y=[y_0, \ldots, y_{r-1}]^T$ is an $n_R \times 1$ receive signal vector, $x=[x_0, x_1]^T$ is a 2×1 transmit signal vector, $H=[h_0, h_1]$ is an $n_R \times 2$ channel coefficient matrix, $h_i=[h_{i,0}, \ldots, h_{i,n_R-1}]^T$, $h_{i,j}$ represents a channel between i-th transmit and j-th receive antennas, n is an additive white Gaussian noise vector with covariance $E\{nn^H\}=\sigma^2 I$, $ch_{pow}=(|h_1|^2+\sigma^2)(|h_0|^2+\sigma^2)-|h_0^H h_1|^2$, and $n'=(|h_1|^2+\sigma^2)h_0^H n - h_0^H h_1 h_1^H n$.

2. The method of claim 1, further comprising providing the generated LLR information to a decoder.

3. The method of claim 1, wherein Q is 256 and C is 128.

4. The method of claim 1, wherein the LLR information is generated using:

$$L_A(b_{0,l}) \approx \log \frac{\max\limits_{x_0 \in X_{128}(\hat{x}_0) \& b_{0,l}=0} \max\limits_{x_1} e^{-\frac{\|y-Hx\|^2}{\sigma^2}} \prod\limits_{(m,n)\neq(i,l)} P(b_{m,n})}{\max\limits_{x_0 \in X_{128}(\hat{x}_0) \& b_{0,l}=1} \max\limits_{x_1} e^{-\frac{\|y-Hx\|^2}{\sigma^2}} \prod\limits_{(m,n)\neq(i,l)} P(b_{m,n})} + L_a(b_{0,l})$$

where $b_{0,l}$ represents an l-th bit of symbol $x_0$, $L_A(b_{0,l})$ is a posteriori LLR of $b_{0,l}$ and $X_{128}(\hat{x}_0)$ is a set of 128 initial candidates selected using the initial MMSE estimation $\hat{x}_0$.

5. A method comprising:
receiving a plurality of signals including Q-order quadrature amplitude modulation (QAM) symbols;
determining a reduced candidate set including C potential candidates, where C is less than Q;
calculating Euclidean distances (EDs) based on the reduced candidate set; and
generating log-likelihood ratio (LLR) information based on the calculated EDs,
wherein determining the reduced candidate set comprises:
receiving prior information;
determining a linear minimum mean square error (MMSE) soft interference cancellation (MMSE-SIC); and
selecting the reduced candidate set based on the determined linear MMSE-SIC, and wherein the linear MMSE-SIC is determined using:

$$\hat{x}_0 = \frac{1}{ch_{pow}}\left((\lambda_1^2|h_1|^2+\sigma^2)\lambda_0^2 h_0^H y - \lambda_0^2\lambda_1^2 h_0^H h_1 h_1^H y - \sigma^2\lambda_0^2 h_0^H h_1 \mu_1 - \right.$$
$$\left.((\lambda_1^2|h_1|^2+\sigma^2)\lambda_0^2|h_0|^2 - \lambda_0^2\lambda_1^2|h_0^H h_1|^2)\mu_0\right)+\mu_0$$
$$= \frac{1}{ch_{pow}}\left((\lambda_1^2|h_1|^2+\sigma^2)\lambda_0^2 h_0^H y - \lambda_0^2\lambda_1^2 h_0^H h_1 h_1^H y - \sigma^2\lambda_0^2 h_0^H h_1 \mu_1 + \right.$$
$$\left. \sigma^2(\lambda_1^2|h_1|^2+\sigma^2)\mu_0\right)$$

where $y=[y_0, \ldots, y_{r-1}]^T$ is an $n_R\times 1$ receive signal vector, $x=[x_0, x_1]^T$ is a 2×1 transmit signal vector, $H=[h_0, h_1]$ is an $n_R\times 2$ channel coefficient matrix, $h_i=[h_{i,0}, \ldots, h_{i,n_R-1}]^T$, $h_{i,j}$ represents a channel between i-th transmit and j-th receive antennas, $ch_{pow}=(|h_1|^2+\sigma^2)(|h_0|^2+\sigma^2)-|h_0^H h_1|^2$, $\mu_i=E\{x_i\}$, and $$E\left\{\begin{bmatrix} x_0-\mu_0 \\ x_1-\mu_1 \end{bmatrix}\begin{bmatrix} x_0^*-\mu_0^* & x_1^*-\mu_1^* \end{bmatrix}\right\} = \begin{bmatrix} \lambda_0^2 & 0 \\ 0 & \lambda_1^2 \end{bmatrix}.$$

6. The method of claim 5, wherein the prior information includes at least one of self-prior information and cross-prior information.

7. An apparatus comprising:
a plurality of antennas; and
a multiple input multiple output (MIMO) detector that receives, via the plurality of antennas, a plurality of signals including Q-order quadrature amplitude modulation (QAM) symbols, determines a reduced candidate set including C potential candidates, where C is less than Q, calculates Euclidean distances (EDs) based on the reduced candidate set, and generates log-likelihood ratio (LLR) information based on the calculated EDs,
wherein the MIMO detector determines the reduced candidate set by:
determining a linear minimum mean square error (MMSE); and
selecting the reduced candidate set based on the determined linear MMSE, and wherein the MIMO detector determines the linear MMSE using:

$$\hat{x}_0 = \frac{1}{ch_{pow}}\left((|h_1|^2+\sigma^2)h_0^H y - h_0^H h_1 h_1^H y\right)$$
$$= \frac{((|h_1|^2+\sigma^2)|h_0|^2 - |h_0^H h_1|^2)x_0 + \sigma^2|h_0^H h_1|^2 x_1 + n'}{ch_{pow}}$$

where $\hat{x}_0$ represents an initial MMSE estimation, $y=[y_0, \ldots, y_{r-1}]^T$ is an $n_R\times 1$ receive signal vector, $x=[x_0, x_1]^T$ is a 2×1 transmit signal vector, $H=[h_0, h_1]$ is an $n_R\times 2$ channel coefficient matrix, $h_i=[h_{i,0}, \ldots, h_{i,n_R-1}]^T$, $h_{i,j}$ represents a channel between i-th transmit and j-th receive antennas, n is an additive white Gaussian noise vector with covariance $E\{nn^H\}=\sigma^2 I$, $ch_{pow}=(|h_1|^2+\sigma^2)(|h_0|^2+\sigma^2)-|h_0^H h_1|^2$, and $n'=(|h_1|^2+\sigma^2)h_0^H n - h_0^H h_1 h_1^H n$.

8. The apparatus of claim 7, wherein the MIMO detector provides the generated LLR information to a decoder.

9. The apparatus of claim 7, wherein Q is 256 and C is 128.

10. The apparatus of claim 7, wherein the MIMO detector generates the LLR information using:

$$L_A(b_{0,l}) \approx \log \frac{\max\limits_{x_0 \in X_{128}(\hat{x}_0) \& b_{0,l}=0} \max\limits_{x_1} e^{-\frac{\|y-Hx\|^2}{\sigma^2}} \prod\limits_{(m,n)\neq(i,l)} P(b_{m,n})}{\max\limits_{x_0 \in X_{128}(\hat{x}_0) \& b_{0,l}=1} \max\limits_{x_1} e^{-\frac{\|y-Hx\|^2}{\sigma^2}} \prod\limits_{(m,n)\neq(i,l)} P(b_{m,n})} + L_a(b_{0,l})$$

where $b_{0,l}$ represents the l-th bit of symbol $x_0$, $L_A(b_{0,l})$ is a posteriori LLR of $b_{0,l}$ and $X_{128}(\hat{x}_0)$ is the set of 128 initial candidates selected using the initial MMSE estimation $\hat{x}_0$.

11. An apparatus comprising:
a plurality of antennas; and
a multiple input multiple output (MIMO) detector that receives, via the plurality of antennas, a plurality of signals including Q-order quadrature amplitude modulation (QAM) symbols, determines a reduced candidate set including C potential candidates, where C is less than Q, calculates Euclidean distances (EDs) based on the reduced candidate set, and generates log-likelihood ratio (LLR) information based on the calculated EDs,
wherein the MIMO detector determines the reduced candidate set by:

receiving prior information;
determining a linear minimum mean square error (MMSE) soft interference cancellation (MMSE-SIC); and
selecting the reduced candidate set based on the determined linear MMSE-SIC, and wherein the MIMO detector determines the linear MMSE-SIC using:

$$\hat{x}_0 = \frac{1}{ch_{pow}}\left((\lambda_1^2|h_1|^2 + \sigma^2)\lambda_0^2 h_0^H y - \lambda_0^2\lambda_1^2 h_0^H h_1 h_1^H y - \sigma^2\lambda_0^2 h_0^H h_1\mu_1 - \right.$$
$$\left.\left((\lambda_1^2|h_1|^2+\sigma^2)\lambda_0^2|h_0|^2 - \lambda_0^2\lambda_1^2|h_0^H h_1|^2\right)\mu_0\right)+\mu_0$$
$$= \frac{1}{ch_{pow}}\left((\lambda_1^2|h_1|^2+\sigma^2)\lambda_0^2 h_0^H y - \lambda_0^2\lambda_1^2 h_0^H h_1 h_1^H y - \sigma^2\lambda_0^2 h_0^H h_1\mu_1 + \right.$$
$$\left. \sigma^2(\lambda_1^2|h_1|^2+\sigma^2)\mu_0\right)$$

where $y=[y_0, \ldots, y_{r-1}]^T$ is an $n_R \times 1$ receive signal vector, $x=[x_0, x_1]^T$ is a $2 \times 1$ transmit signal vector, $H=[h_0, h_1]$ is an $n_R \times 2$ channel coefficient matrix, $h_i = [h_{i,0}, \ldots, h_{i,n_R-1}]^T$, $h_{i,j}$ represents a channel between i-th transmit and j-th receive antennas, $ch_{pow}=(|h_1|^2+\sigma^2)(|h_0|^2+\sigma^2)-|h_0^H h_1|^2$, $\mu_i=E\{x_i\}$, and $$E\left\{\begin{bmatrix} x_0-\mu_0 \\ x_1-\mu_1 \end{bmatrix}\begin{bmatrix} x_0^*-\mu_0^* & x_1^*-\mu_1^* \end{bmatrix}\right\} = \begin{bmatrix} \lambda_0^2 & 0 \\ 0 & \lambda_1^2 \end{bmatrix}.$$

12. The apparatus of claim 11, wherein the prior information includes at least one of self-prior information and cross-prior information.

13. A system on chip comprising:
a multiple input multiple output (MIMO) detector that receives a plurality of signals including Q-order QAM symbols, determines a reduced candidate set including C potential candidates, where C is less than Q, calculates Euclidean distances (EDs) based on the reduced candidate set, and generates log-likelihood ratio (LLR) information based on the calculated EDs; and
a decoder that decodes the signals using the LLR information,
wherein the MIMO detector determines the reduced candidate set by:
receiving prior information;
determining a linear minimum mean square error (MMSE); and
selecting the reduced candidate set based on the determined linear MMSE, and wherein the MIMO detector determines the linear MMSE using:

$$\hat{x}_0 = \frac{1}{ch_{pow}}\left((|h_1|^2+\sigma^2)h_0^H y - h_0^H h_1 h_1^H y\right)$$

$$= \frac{\left((|h_1|^2+\sigma^2)|h_0|^2 - |h_0^H h_1|^2\right)x_0 + \sigma^2|h_0^H h_1|^2 x_1 + n'}{ch_{pow}}$$

where $\hat{x}_0$ represents an initial MMSE estimation, $y=[y_0, \ldots, y_{r-1}]^T$ is an $n_R \times 1$ receive signal vector, $x=[x_0, x_1]^T$ is a $2 \times 1$ transmit signal vector, $H=[h_0, h_1]$ is an $n_R \times 2$ channel coefficient matrix, $h_i = [h_{i,0}, \ldots, h_{i,n_R-1}]^T$, $h_{i,j}$ represents a channel between i-th transmit and j-th receive antennas, n is an additive white Gaussian noise vector with covariance $E\{nn^H\}=\sigma^2 I$, $ch_{pow}=(|h_1|^2+\sigma^2)(|h_0|^2+\sigma^2)-|h_0^H h_1|^2$, and $n'=(|h_1|^2+\sigma^2)h_0^H n - h_0^H h_1 h_1^H n$.

14. A system on chip comprising:
a multiple input multiple output (MIMO) detector that receives a plurality of signals including Q-order QAM symbols, determines a reduced candidate set including C potential candidates, where C is less than Q, calculates Euclidean distances (EDs) based on the reduced candidate set, and generates log-likelihood ratio (LLR) information based on the calculated EDs; and
a decoder that decodes the signals using the LLR information,
wherein the MIMO detector determines the reduced candidate set by:
receiving prior information;
determining a linear minimum mean square error (MMSE) soft interference cancellation (MMSE-SIC); and
selecting the reduced candidate set based on the determined linear MMSE-SIC, and wherein the MIMO detector determines the linear MMSE-SIC using:

$$\hat{x}_0 = \frac{1}{ch_{pow}}\left((\lambda_1^2|h_1|^2 + \sigma^2)\lambda_0^2 h_0^H y - \lambda_0^2\lambda_1^2 h_0^H h_1 h_1^H y - \sigma^2\lambda_0^2 h_0^H h_1\mu_1 - \right.$$
$$\left.\left((\lambda_1^2|h_1|^2+\sigma^2)\lambda_0^2|h_0|^2 - \lambda_0^2\lambda_1^2|h_0^H h_1|^2\right)\mu_0\right)+\mu_0$$
$$= \frac{1}{ch_{pow}}\left((\lambda_1^2|h_1|^2+\sigma^2)\lambda_0^2 h_0^H y - \lambda_0^2\lambda_1^2 h_0^H h_1 h_1^H y - \sigma^2\lambda_0^2 h_0^H h_1\mu_1 + \right.$$
$$\left. \sigma^2(\lambda_1^2|h_1|^2+\sigma^2)\mu_0\right)$$

where $y=[y_0, \ldots, y_{r-1}]^T$ is an $n_R \times 1$ receive signal vector, $x=[x_0, x_1]^T$ is a $2 \times 1$ transmit signal vector, $H=[h_0, h_1]$ is an $n_R \times 2$ channel coefficient matrix, $h_i = [h_{i,0}, \ldots, h_{i,n_R-1}]^T$, $h_{i,j}$ represents a channel between i-th transmit and j-th receive antennas, $ch_{pow}=(|h_1|^2+\sigma^2)(|h_0|^2+\sigma^2)-|h_0^H h_1|^2$, $\mu_i=E\{x_i\}$, and $$E\left\{\begin{bmatrix} x_0-\mu_0 \\ x_1-\mu_1 \end{bmatrix}\begin{bmatrix} x_0^*-\mu_0^* & x_1^*-\mu_1^* \end{bmatrix}\right\} = \begin{bmatrix} \lambda_0^2 & 0 \\ 0 & \lambda_1^2 \end{bmatrix}.$$

* * * * *